United States Patent [19]
Nicholls

[11] 3,965,930
[45] June 29, 1976

[54] CHECK VALVE ASSEMBLY

[75] Inventor: Bryan Frederick Nicholls, Northampton, England

[73] Assignee: The Mettoy Company Limited, Northampton, England

[22] Filed: Feb. 25, 1975

[21] Appl. No.: 552,966

[30] Foreign Application Priority Data
Mar. 5, 1974   United Kingdom................. 9919/74

[52] U.S. Cl............................ 137/525; 137/512.4; 137/516.15
[51] Int. Cl.² ....................................... F16K 15/14
[58] Field of Search............ 137/525, 512.4, 516.15; 285/DIG. 22

[56] References Cited
UNITED STATES PATENTS

| | | | |
|---|---|---|---|
| 2,715,980 | 8/1955 | Frick | 137/525 X |
| 2,855,206 | 10/1958 | Haviland | 285/DIG. 22 |
| 2,890,838 | 6/1959 | Jannsen | 137/525 X |
| 3,410,299 | 11/1968 | Whittington | 137/525 X |
| 3,601,151 | 8/1971 | Winnard | 137/525 |
| 3,853,338 | 12/1974 | Wilson | 285/DIG. 22 |

*Primary Examiner*—William R. Cline
*Attorney, Agent, or Firm*—Brisebois & Kruger

[57] ABSTRACT

A member of a non-return valve having an axial blind bore defining an inlet, a cylindrical sealing surface recessed between axially spaced radial shoulders, and one or more radial passageways in the region of the sealing surface communicating with the bore and sealed against return fluid flow by an elastomeric sleeve carried by the sealing surface, is constructed in two parts of synthetic plastics material which snap fit together, with the shoulders being formed one on each part.

2 Claims, 3 Drawing Figures

CHECK VALVE ASSEMBLY

This invention relates to valves, and more particularly to non-return valves of the type commonly used in inflatable articles, comprising a generally cylindrical valve member having a blind axial bore defining an inlet at one end of the member, a circumferential undercut recess defining a sealing surface between axially spaced end walls of the recess for carrying a close-fitting sleeve of elastomeric material, and one or more radial through passageways in the region of the recess and communicating with the bore. In use, the sleeve seals the radial passageways to prevent reverse fluid flow through the valve.

In the past the valve members have been metallic, usually brass, and manufactured by methods involving machining operations. It would clearly be economically advantageous to be able to produce the valve members by molding from synthetic plastics material, but when an article including an undercut recess is molded in one piece by conventional methods, a mold having two radially separable mold parts is required to produce the recess. As a result, axially extending flashes of plastics material would be produced along the sealing surface, preventing the elastomeric sleeve from fully sealing the radial passageways.

In accordance with the present invention there is provided for a non-return valve of the type described above, a valve member of two part construction, which parts are separately molded from synthetic plastics material, with the surfaces forming the end walls of the recess provided one on each part.

By making the valve member in two such parts which preferably snap fit together, the undercut recess of the assembled member is provided without having to use radially separable mold parts.

In a preferred embodiment of the invention, one part is generally cylindrical and has an axially extending blind bore and a stepped outer diameter. The portion of smaller outer diameter defines a sealing surface for supporting the elastomeric sleeve and includes a radial through passageway communicating with the bore. The smaller diameter portion is additionally shaped at its free end, opposite the valve inlet, for snap-fitting engagement with the other valve member part which has a maximum outer diameter substantially greater than the outer diameter of the smaller portion of the first mentioned part, for retaining the sleeve in position on the first part.

To assist a better understanding of the invention, a valve member of the presently preferred construction is described below, by way of example, with reference to the accompanying drawings, in which.

Figure 1:
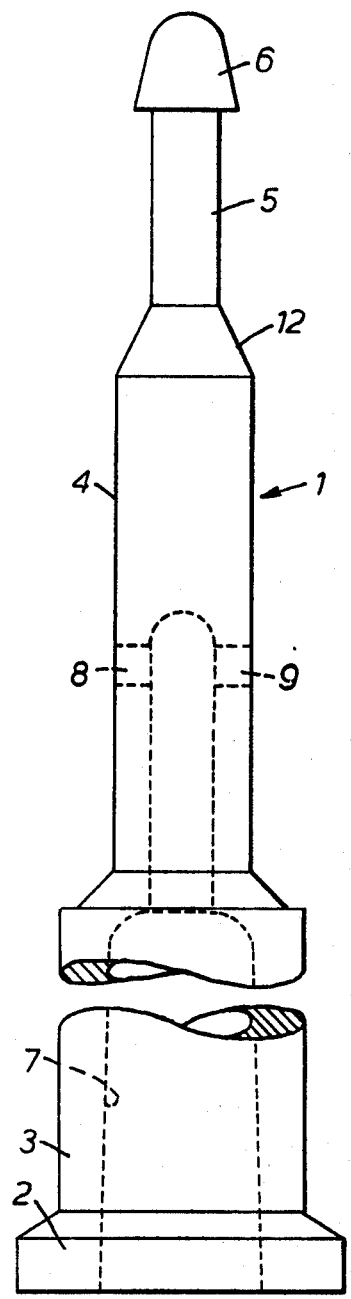
FIG. 1 is a side elevational view of a first part of the valve member.
Figure 2:
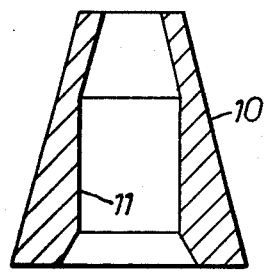
FIG. 2 is an axial cross-section through the second part of the valve member.

The two part valve member which is molded from synthetic plastics material, for example nylon, has an elongated cylindrical first part 1 which is axially divided into a flange 2, a shank portion 3, a sealing portion 4 of smaller diameter than the shank for receiving a sleeve of elastomeric material, and an end portion including a circumferential undercut recess 5 and an enlarged head 6. An axially extending blind bore 7 in the valve part 1 is open at the flange end to define a valve inlet orifice. Two radially extending through passageways 8, 9 are provided in the sealing portion 4 and communicate with the bore adjacent its inner, closed end.

Figure 3:
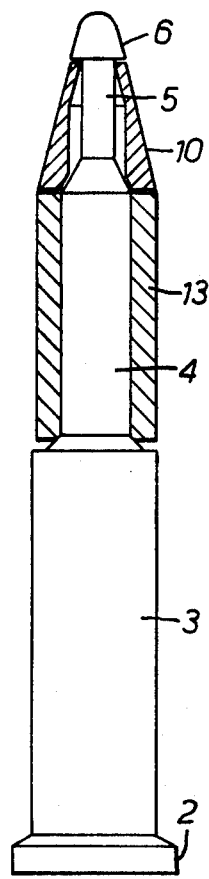
FIG. 3 is an elevational view shown partly in cross-section, of an assembled valve.

The undercut recess 5 and head 6 are shaped to form a snap action connection with a separately molded second valve member part or cap 10 which is frusto-conical in external shape and has a through bore 11. Over the major portion of its length the bore 11 is large enough to accommodate the head 6 of the first part, but it has an inwardly tapering inner surface portion adjacent its narrow end which will snap over the head 6, due to the resilience of the plastics material, to locate and positively retain the cap 10 on the first valve part 1. At the base of the cap 10 the bore 11 has an internally tapered portion which co-operates with an externally tapered portion 12 of the first part 1, as seen in FIG. 3.

Both parts 1, 10 of the valve member lend themselves to production by molding and, since there is no need for axially divided mold parts to produce the sealing portion 4, the formation of undesirable flashing on the sealing surface is easily avoided.

It may be noted that radially separable mold parts are necessary to provide the cap receiving recess 5, but, as this portion does not constitute a sealing surface, any vestigial flashing here does not detract from the performance of the valve.

To assemble the valve, the sleeve 13 of elastomeric material, which may be of rubber or the like, is pushed over the end of the first part on to the sealing portion 4 prior to the cap 10 being snapped into position on the first part 1, in the manner described above. The taper 12 assists location of the sleeve 13, and the valve member construction further simplifies assembly compared with prior valves, since the sleeve does not have to be stretched and forced over the enlarged head.

The bore of the valve member tapers slightly inwardly from the inlet for co-operation with an adaptor, or the like, for supplying fluid to the valve. The member could be otherwise adapted, for example internally screw-threaded at the inlet, for this purpose. An additional advantage of a plastics construction is that the weight of the valve is substantially less than that of an equivalent metallic valve, and consequently the valve has less effect on the balance of the article in which it is fitted. This is particularly useful, for example, in the case of a playball, since it minimises irregular movement of the ball in flight.

Furthermore, plastics material has the advantage of being inherently flexible thereby making the valve resistant to permanent damage, and minimising the detrimental effects of corrosion.

I claim:

1. In a non-return valve comprising a generally cylindrical valve member having opposed axial ends, an axial bore terminating at an inlet in one said end of the member, a pair of axially spaced walls projecting radially from said member and a circumferential sealing surface between said walls for carrying a close fitting sleeve of elastomeric material, and at least one radial passageway extending through said sealing surface and communicating with said bore, the improvement according to which said member is a synthetic plastics molding comprising two parts having snap-fitting interengagement; a first one of said parts defining said axial bore, one of said walls and said circumferential sealing surface and comprising an end portion located beyond the sealing surface having a radially enlarged head and the other one of said parts including the other of said walls, and being annular and resiliently deformable to permit its location over and engagement behind said radially enlarged head of said first part.

2. A valve member as claimed in claim 1 wherein said enlarged head is at the axial end of the first part remote from said inlet.

* * * * *